United States Patent [19]

Hamilton

[11] Patent Number: 5,881,146
[45] Date of Patent: Mar. 9, 1999

[54] METHOD AND APPARATUS FOR DETERMINING DIGITS DIALED USING A SELECTED ALGORITHM

[75] Inventor: Chris Hamilton, Montclair, N.J.

[73] Assignee: Dialogic Corporation, Parsippany, N.J.

[21] Appl. No.: 828,000

[22] Filed: Jun. 4, 1997

Related U.S. Application Data

[63] Continuation of Ser. No. 596,751, Feb. 5, 1996, abandoned.

[51] Int. Cl.$^6$ ............................................. H04M 3/22
[52] U.S. Cl. ........................... 379/286; 379/31; 379/359
[58] Field of Search .................... 379/386, 246, 379/377, 286, 31, 32, 257, 351, 342, 282, 339, 359

[56] References Cited

U.S. PATENT DOCUMENTS

| | | | |
|---|---|---|---|
| 3,410,967 | 11/1968 | Boring | 379/31 |
| 3,452,160 | 6/1969 | McFarland | 379/31 |
| 3,708,792 | 1/1973 | Malm et al. | 379/31 |
| 3,718,778 | 2/1973 | Anderson | 379/31 |
| 3,747,009 | 7/1973 | Funke | 379/351 |
| 3,808,373 | 4/1974 | McLaughlin | 379/286 |
| 3,917,913 | 11/1975 | Patten | 379/282 |
| 3,935,392 | 1/1976 | Smith et al. | 379/286 |
| 3,988,548 | 10/1976 | Waldeck | 379/342 |
| 3,997,740 | 12/1976 | Eubank et al. | 379/31 |
| 4,042,784 | 8/1977 | Lupattelli et al. | 379/286 |
| 4,227,054 | 10/1980 | Gilmer | 379/342 |
| 4,230,912 | 10/1980 | Lee et al. | 379/342 |
| 4,319,091 | 3/1982 | Meri | 379/342 |
| 4,326,105 | 4/1982 | Vaughan et al. | 379/342 |
| 4,839,920 | 6/1989 | Held-Elbert et al. | 379/286 |
| 4,868,873 | 9/1989 | Kamil | 379/386 |
| 4,924,501 | 5/1990 | Cheeseman et al. | 379/201 |
| 4,944,001 | 7/1990 | Kizuik et al. | 379/286 |
| 5,020,099 | 5/1991 | Katagawa | 379/257 |
| 5,163,050 | 11/1992 | Cromack | 379/351 |
| 5,218,636 | 6/1993 | Hamilton | 379/386 |
| 5,369,697 | 11/1994 | Murray et al. | 379/386 |
| 5,406,621 | 4/1995 | Binal | 379/351 |
| 5,422,945 | 6/1995 | Wyatt | 379/386 |
| 5,506,885 | 4/1996 | Hamilton | 379/257 |

*Primary Examiner*—Ahmad F. Matar
*Assistant Examiner*—Scott Wolinsky
*Attorney, Agent, or Firm*—Jeffrey I. Kaplan, Esq

[57] ABSTRACT

A technique for minimizing the number of users which must dial training digits in a voice processing system. The system uses the first digit normally dialed as part of the user responses to the voice processing application, and measures such digit to determine whether it and future digits can be detected accurately without the use of a training digit. If they can, no training digit is required. If they can't, then a training digit is required, and the user is prompted for the same.

9 Claims, 2 Drawing Sheets

5,881,146

METHOD AND APPARATUS FOR DETERMINING DIGITS DIALED USING A SELECTED ALGORITHM

This application is a continuation of application Ser. No. 08/596,751, filed Feb. 5,1996, now abandoned.

TECHNICAL FIELD

This invention relates to telephones, and more particularly, to an improved technique of entering Dial Pulse Digits (DPD).

BACKGROUND OF THE INVENTION

Automated voice processing systems have become widely prevalent over the past several years. In such systems, a remotely located user accesses the system by dialing a predetermined telephone number, thereby effectuating a connection from the remote telephone terminal to the voice processing system. The voice processing system, typically a personal computer based device, receives commands from the remote user in the form of dialed digits. The voice processing system then acts upon the dialed digits by performing various functions such as reading account balances, issuing further instructions, etc.

In many present day systems, such digits are dialed by the user entering Dual Tone Multi Frequency (DTMF) digits. In accordance with the DTMF system, a predetermined set of two frequencies is assigned to each digit. The particular digit entered by a remote user is decoded by the voice processing system by analyzing the signal received in order to determine which two particular frequencies are contained therein. The two frequencies identify the particular digit dialed.

One problem with these systems is that in many areas of the United States and abroad, the majority of the telephone switches are not equipped with DTMF capability. Rather, many phones utilize Dial Pulse Digits (DPD), the more conventional type of telephone in which digits are entered by rotating and then releasing the dialer, thereby allowing it to rotate back to its original position. As the dialer rotates back to its original position, a plurality of "clicks" are produced, whereby the loop current to the central office is repetitively connected and disconnected. This sequence of clicks is termed "the DPD sequence," and is an analog signal which is, in the ideal situation, substantially periodic. The DPD sequence comprises a plurality of pulses, where each pulse. is one period of a substantially periodic signal. Each pulse may include one or more clicks The number of clicks N produced is related to the dialed digit by a simple arithmetic formula (e.g. 2N+1, 2N, etc.) which varies from system to system. Additionally, there is sometimes an extra click or two at the beginning of the sequence, or the end. In short, many properties of DPD sequences vary from system to system, which properties include (i) number of clicks per pulse (ii) presence or absence of a pulse at the start of the sequence, and (iii) presence or absence of a pulse at the end of the sequence.

In such systems, the voice processing system must decode the particular digit dialed by counting the number of pulses, or the length of the sequence of clicks, or by measuring some other parameter of the sequence of pulses in order to determine the particular digit dialed. One common technique is to ascertain the period of the DPD signal, and divide the length of the signal by the period thereof.

The problem with such systems is that they are not nearly as accurate as DTMF systems. Several characteristics of DPD systems cause such systems to have a much higher error rate than their DTMF counterparts. One major problem is that the DPD sequence is not perfectly periodic. Rather, the duration of each pulse, and the time periods therebetween, may vary. On some DPD telephones, the variance is so great that the sequence can not even be considered periodic. Thus, it becomes difficult to detect the digit by simply dividing the length of the signal by the period thereof. Accordingly, it is extremely difficult to configure a voice processing system to accurately detect DPD digits dialed from different telephones which produce greatly varying signals.

In an attempt to solve the above problem, the technique of a training digit has been utilized by DPD voice processing system providers. The training digit systems prompt the user to enter a training digit when the call is first connected. The system may play an audible message, for example, which says "enter the number 0." When the user dials the zero, a voice processing system can then measure the length of the sequence produced and adjust its detection criteria to optimize detection of digits having the parameters contained in the DPD sequence which produces the training digit. For example, future dialed digits may be detected by comparing the sequence thereof to the sequence of the training digit. If the training digit is a zero, then a digit having a sequence four-tenths the length of the training digit is a four.

A problem with the use of a training digit is that it is annoying for an end user. Before entering data, the user must dial the training digit, which wastes time. However, without the training digit, the "bad" rotary telephones which produce DPD sequences that are not periodic will cause errors at the voice processing system.

SUMMARY OF THE INVENTION

The above and other problems of the prior art are overcome in accordance with the invention which relates to a voice processing system that measures variations in the length of pulses received as a result of a first dialed digit, and only prompts the user for a training digit if the variations are too great. Accordingly, training digits are utilized only when necessary.

DETAILED DESCRIPTION OF THE PREFERRED EMBODIMENT

Figure 1:
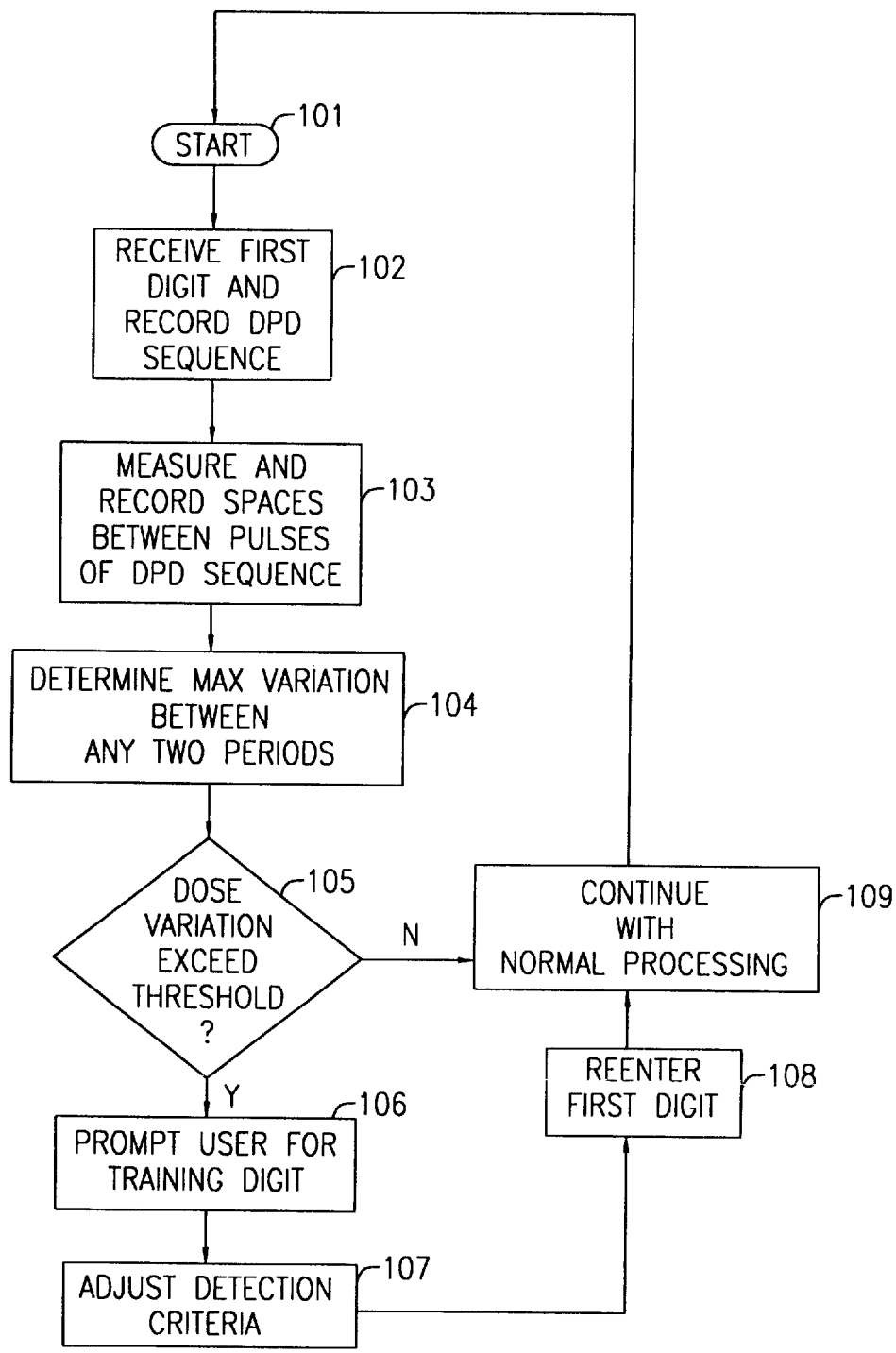
FIG. 1 is a flow chart of an algorithm for use in implementation of the present invention.

FIG. 1 shows a basic flow chart to be utilized in implementing the required steps of the present invention. The arrangement of FIG. 2 can be utilized to implement the techniques of FIG. 1. Each of operational blocks 101 through 109 is shown only in conceptual form, and may be implemented by any software programmer in the art with a minimum level of skill. Indeed, many of the required algorithms, such as prompting a user to enter a particular digit, are already available "off the shelf."

The program is entered at start 101, which is immediately prior to the first digit of a sequence of digits being received. For example, the telephone may be answered by the voice processing system, and the voice processing system transmits a greeting message along with a request for the remote user to enter an account number. Start block 101 is intended to show the flow of control immediately prior to entry by the user of the first digit of the account number.

The voice processing system receives the first digit at block 102, and records a digital signal representation of the DPD sequence generated by the first digit. At block 103, the spaces between the pulses of the first digit's DPD sequence are measured and recorded in the system's working memory. The system then determines the maximum variation between any two periods of the first digit's sequence at block 104. Block 105 then checks to see if the variation exceeds a threshold. If so, control is transferred to block 106 where the user is promoted for a training digit.

Consider the situation where the variation are small, below the predetermined threshold. This means that the period of the incoming DPD signal is virtually constant, and the dialed digit can be measured by simply dividing the length of the incoming signal by its own period. Such being the case, control passes to block 109. It has been found that such a technique works provided that the period of DPD pulses does not vary by more than ten percent. Thus, as long as the signal is periodic, to within a specified tolerance, a first algorithm (i.e.; division) is used to detect the digit.

On the other hand, if the period is varying by a great amount, then there is no true measure of the period of the signal produced by the DPD digit, and the digit must be measured by a different technique. Thus, the detection criteria for all DPD digits is adjusted at block 107. At block 108, the first digit may be reentered, or, alternatively, block 108 may be eliminated by simply comparing the previously stored first digit to the now newly entered training digits. In any event, control is transferred then to operational block 109, whether or not operational block 108 is required. Thereafter, operation proceeds in a normal fashion as dictated by any one of a variety of well known voice processing applications.

Adjustment of the detection criteria at block 107 comprises changing the algorithm used to detect future digits. Specifically, rather than future digits being detected by dividing the length of the sequence by its period, future digits are detected by measuring the length of the DPD sequence produced by such digit, and comparing said length to the length of the DPD sequence produced by the training digit. Accordingly, the lack of periodicity does not preclude accurate detection.

Figure 2:
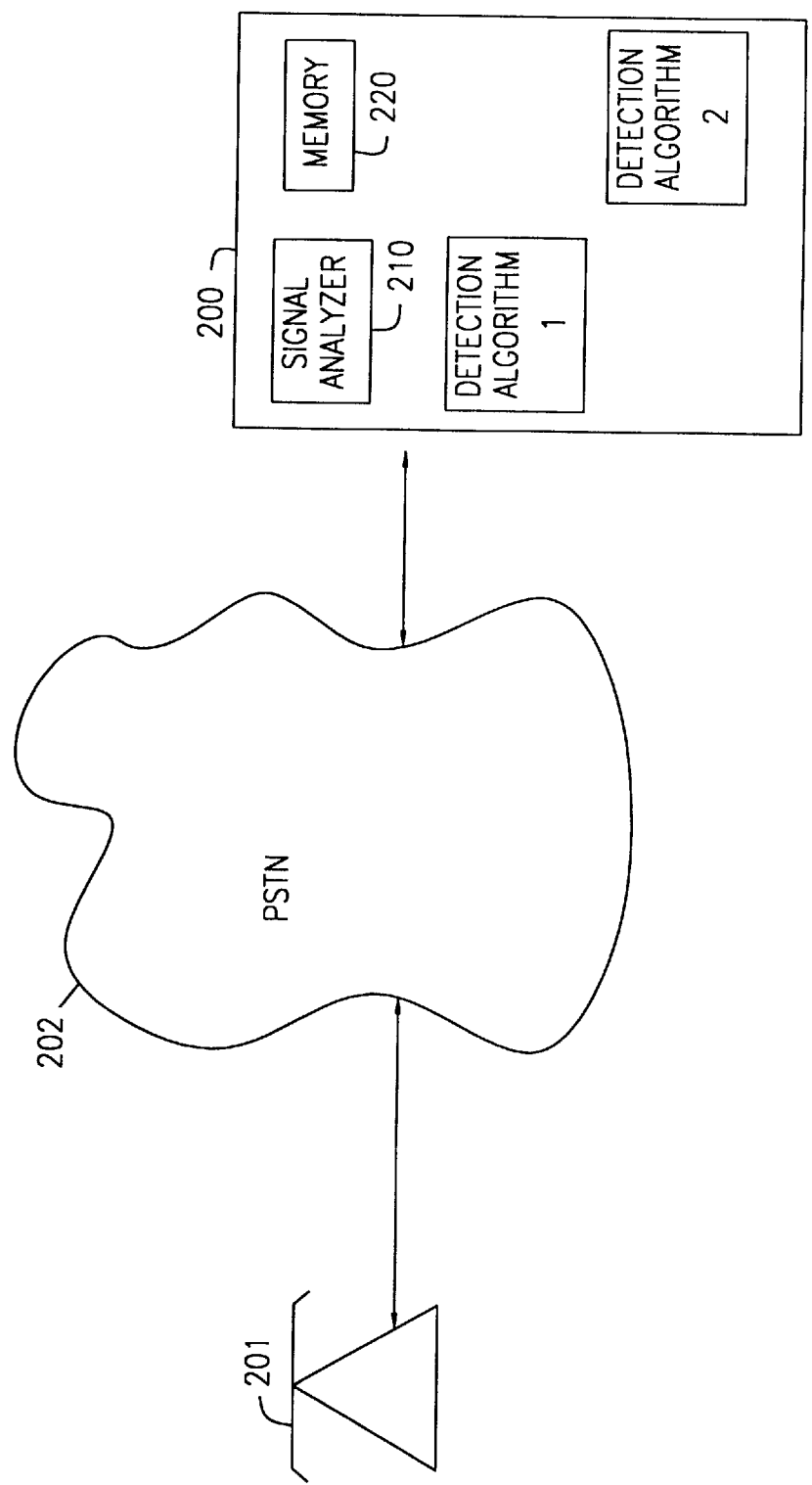
FIG. 2 is a block diagram of the basic components of the voice processing system used in connection with the present invention.

FIG. 2 shows an exemplary telephone 201 connected to a voice processing system 200 through the public switched telephone network 202. As previously described, the voice processing system 200 includes a signal analyzer 210 for determining if the first dialed digit is periodic. The detection algorithms 1 or 2 may be utilized depending upon whether the first dialed digit is periodic. The system also includes working memory 220.

It can be seen that the above described invention permits use of a training digit while only requiring such use when the system determines that the incoming DPD signal is of such a nature as to require such a training digit. Accordingly, only a small percentage of callers are inconvenienced with the requirement to dial a training digit.

While the above describes the preferred embodiment of the invention, it can be readily appreciated that other variations are possible.

I claim:

1. A method of determining which one of a plurality of possible digits has been dialed by a remote caller, the dialing of said one digit producing a signal comprising a sequence of pulses, the method comprising the steps of:

determining whether or not the maximum variation between any two periods of said sequence exceeds a predetermined threshold;

if said variation does not exceed said threshold, utilizing a first algorithm to determine the digit dialed by dividing the length of said sequence by the length of the period of said sequence; and if said variation exceeds said threshold, prompting said remote caller and utilizing a second algorithm to determine future dialed digits.

2. The method of claim 1 wherein said remote caller is prompted to dial a training digit.

3. The method of claim 2 wherein said second algorithm compares said sequence to a signal produced by said training digit.

4. A method of determining which one of a plurality of possible digits has been dialed, the dialing of said one digit producing a signal, the method comprising the steps of:

determining whether or not a property of said signal exceeds a predetermined threshold;

determining future dialed digits using a first algorithm if said property does not exceed said threshold; and determining future dialed digits using a second algorithm if said property exceeds said threshold, said second algorithm comparing a signal produced by a dialed digit to be determined to a signal produced by a previously dialed digit, and said first algorithm including no such comparison.

5. The method of claim 4, wherein said property is periodicity, said first algorithm includes counting periods, and said second algorithm includes comparing a signal produced by one of said future digits to a stored signal.

6. The method of claim 5 further comprising the step of storing a signal produced by a training digit, said training digit dialed by a user in response to a prompt.

7. Apparatus for determining which one of a plurality of possible digits has been dialed, the dialing of said one digit producing a signal, said apparatus comprising:

means for determining whether or not a property of said signal exceeds a predetermined threshold;

means for determining future dialed digits using a first algorithm if said property does not exceed said threshold; and means for determining future dialed digits using a second algorithm if said property exceeds said threshold, said second algorithm comparing a signal produced by a dialed digit to be determined to a signal produced by a previously dialed digit, and said first algorithm including no such comparison.

8. Apparatus of claim 7 wherein said property is periodicity, said first algorithm includes counting periods, and said second algorithm includes comparing a signal produced by one of said future digits to a stored signal.

9. Apparatus of claim 5 further comprising means for storing a signal produced by a training digit, said training digit being a predetermined digit dialed by a user in response to a prompt.

* * * * *

UNITED STATES PATENT AND TRADEMARK OFFICE
CERTIFICATE OF CORRECTION

PATENT NO. : 5,881,146
DATED : March 9, 1999
INVENTOR(S) : Hamilton

It is certified that error appears in the above-identified patent and that said Letters Patent is hereby corrected as shown below:

<u>Column 3,</u>
Line 9, insert -- DPD -- before the word "sequence".
Line 13, delete "variation" and insert -- variations --.

Signed and Sealed this

Twenty-first Day of September, 2004

JON W. DUDAS
*Director of the United States Patent and Trademark Office*